(12) United States Patent
Shin et al.

(10) Patent No.: US 7,613,669 B2
(45) Date of Patent: Nov. 3, 2009

(54) METHOD AND APPARATUS FOR STORING PATTERN MATCHING DATA AND PATTERN MATCHING METHOD USING THE SAME

(75) Inventors: Seung Won Shin, Daejeon (KR); Jin Tae Oh, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 479 days.

(21) Appl. No.: 11/453,954

(22) Filed: Jun. 14, 2006

(65) Prior Publication Data

US 2007/0094178 A1 Apr. 26, 2007

(30) Foreign Application Priority Data

Aug. 19, 2005 (KR) .................. 10-2005-0076453
Oct. 18, 2005 (KR) .................. 10-2005-0098075

(51) Int. Cl.
*G06N 5/02* (2006.01)
*G06F 9/26* (2006.01)
*G06F 9/34* (2006.01)
*G06F 7/00* (2006.01)
*G06F 17/30* (2006.01)

(52) U.S. Cl. .................. 706/46; 711/210; 711/216; 707/6

(58) Field of Classification Search ............ 706/45–47; 711/210, 216; 707/6, E17.036
See application file for complete search history.

(56) References Cited

U.S. PATENT DOCUMENTS

| 5,619,713 | A | * | 4/1997 | Baum et al. | ................. 707/102 |
| 6,049,804 | A | * | 4/2000 | Burgess et al. | .............. 707/100 |
| 6,535,867 | B1 | * | 3/2003 | Waters | .......................... 707/1 |
| 7,100,020 | B1 | * | 8/2006 | Brightman et al. | ............ 712/18 |

(Continued)

FOREIGN PATENT DOCUMENTS

KR 1020050024571 A 3/2005

OTHER PUBLICATIONS

Alfred V. Aho et al., Compliers, Principles, Techniques, and Tools, 1988, Addison-Wesley, 434-435.*

(Continued)

*Primary Examiner*—David R Vincent
*Assistant Examiner*—Benjamin Buss
(74) *Attorney, Agent, or Firm*—Blakely, Sokoloff, Taylor & Zafman LLP

(57) ABSTRACT

A method and apparatus for storing pattern matching data and a pattern matching method using the method and apparatus are provided. The method of storing original data for pattern matching in a pattern matching apparatus includes: dividing the original data into segments of a predetermined size; performing a hash operation on each of the divided segments; determining whether or not the hash operation value of each segment causes a hash collision with a hash operation value stored in a first external memory disposed outside the pattern matching apparatus; and controlling the hash operation value of each segment determined not to cause a hash collision to be stored in the first external memory. According to the method and apparatus, the original data desired to be used for pattern matching can be stored at a faster speed in a pattern matching data storing apparatus.

19 Claims, 9 Drawing Sheets

U.S. PATENT DOCUMENTS

2003/0023846 A1* 1/2003 Krishna et al. .............. 713/162
2003/0037055 A1* 2/2003 Cheng et al. ................ 707/100
2003/0182448 A1* 9/2003 Gooch et al. ................ 709/245
2004/0221132 A1* 11/2004 Torkelsson et al. .......... 711/210
2005/0081041 A1* 4/2005 Hwang ....................... 713/176
2006/0095458 A1* 5/2006 Siu et al. ................... 707/102

OTHER PUBLICATIONS

Mayez Al-Mouhamed, A Robust Gross-to-Fine Pattern Recognition System, 2001, IEEE, 1226-1237.*

Fang Yu et al., "Gibabit Rate Packet Pattern-Matching Using TCAM", Proceedings of the 12th IEEE International Conference on Network Protocols (ICNP'04) 1092-1648/04, IEEE COmputer Society (10 pages).

* cited by examiner

METHOD AND APPARATUS FOR STORING PATTERN MATCHING DATA AND PATTERN MATCHING METHOD USING THE SAME

CROSS-REFERENCE TO RELATED PATENT APPLICATIONS

This application claims the benefit of Korean Patent Application Nos. 10-2005-0076453, filed on Aug. 19, 2005 and 10-2005-0098075, filed on 18 Oct., 2005 in the Korean Intellectual Property Office, the disclosure of which are incorporated herein in their entirety by reference.

BACKGROUND OF THE INVENTION

1. Field of the Invention

The present invention relates to a method and apparatus for storing pattern matching data and a pattern matching method using the method and apparatus, and more particularly, to a pattern matching data storing method and apparatus capable of quickly storing and retrieving a predetermined pattern in a variety of fields, such as an intrusion detection system, a spam mail checking system, and a high capacity database, and a pattern matching method using the method and apparatus.

2. Description of the Related Art

As high speed networks have become commonplace, a variety of services using the networks have been introduced. With the introduction of these services, it has become possible to transmit a variety of information using the networks, and based on this environment, diverse business models have come to be generated.

However, since a lot of illegal copying and hacking activities are performed on the networks, those who want to run commercial businesses need a network infringement countermeasure apparatus and other related apparatuses in order to protect information generated for profits or to be sold for profits. Here, the most basic technology for these apparatuses is a high speed pattern matching technology.

Pattern matching technology is a technology encompassing a wide range of applications. It can be used in a search engine of an intrusion detection system to detect viruses or hacking activities, or it can be used to find out spam mail or a predetermined pattern on a network. Thus, its applications are very diversified. More specifically, for example, its applications include finding a desired letter in a long text file, security systems, such as a network intrusion detection system, a spam mail removal system, and a database system. Accordingly, there is great demand for pattern matching technology.

At present, the pattern matching technologies applied to these applications are mostly implemented by software. This is because most pattern matching technologies were developed a long time ago, and previously, most applications had to find a simple pattern in a small number of data sets rather than comparing a pattern with a large number of patterns.

However, these days where high performance networks have been developed and a huge amount of data is frequently transmitted and managed, it is impossible to find a pattern in real time using these software-based methods. Though these software methods may be used in non-time-dependent cases, these methods requiring a long time to find a pattern cannot be applied to systems that operate in real time, such as an intrusion detection system, a spam mail removal system, and a network analysis system, Accordingly, in order to improve the performance of the pattern matching technology, a technology comparing patterns by implementing an algorithm with hardware has been introduced. However, when a pattern matching engine is implemented by hardware, the following problems occur.

First, since a pattern is modified whenever a user specifies a pattern, it is difficult to implement it with hardware. Also, generally the pattern matching technology should retrieve a data character string as well as the header of a network packet, and the length of a data character string desired to be found varies greatly from a simple one-byte rule to an over 100-byte data character string that requires a high accuracy. Also, since the number of patterns that are desired by a user varies from hundreds to millions, it is very difficult to implement this with hardware.

In a hash method that is one of the described above, due to the phenomenon in which a data retrieval time increases because of hash key collision and tree type data connection, the amount of data that should be processed increases and it is difficult to implement a desired performance. That is, when the number of patterns (or rules) that the user wants to find out through comparison, a problem, such as a shortage of resources in hardware, occurs (the increase of resources causes the cost to increase) and its implementation is difficult. A comparison with a huge number of patterns by investing all available resources may be performed but in that case the cost is too high. Accordingly, it can be regarded as an appropriate solution.

Examples of an actual implementation of a hardware-based pattern matching apparatus are as the following. FIG. 1 illustrates an example of a conventional pattern matching apparatus, and FIG. 2 illustrates another example of a conventional pattern matching apparatus.

However, in the hardware-based pattern matching apparatuses illustrated in FIGS. 1 and 2, if the number of patterns desired to be compared increases, a field programmable gate array (FPGA) has to be newly programmed. Also, when many rules are mounted, the complexity of the circuit and the amount of memory use increases such that it becomes difficult to implement a desired speed and the cost also increases.

Also, by adding an additional external memory, the amount of patterns that can be compared can be increased. However, since the speed of an external memory is relatively slower than that of an internal memory, the method of frequently accessing the external memory and reading and/or writing data is not a satisfactory solution. Because of these problems, the hardware-based pattern matching apparatuses can compare only a small number of patterns at a high speed. Accordingly, for products handling a large amount of data at high speeds, a new technology is urgently needed.

SUMMARY OF THE INVENTION

The present invention provides a dual memory structure including an internal memory and an external memory, in which the external memory of the dual memory structure is set as a space capable of storing a large number of patterns that can be compared, and the internal memory stores data that causes a hash collision in the external memory and can be accessed frequently.

Also, since the performance of the external memory is lowered if the number of accesses increases, the external memory is provided as a perfect hash table minimizing accesses.

According to an aspect of the present invention, there is provided a method of storing original data for pattern matching in a pattern matching apparatus, the method including: dividing the original data into segments of a predetermined size; performing a hash operation on each of the divided segments; determining whether or not a hash operation value of each segment causes a hash collision with a hash operation value stored in a first external memory disposed outside the pattern matching apparatus; and controlling the hash operation value of each segment determined not to cause a hash collision, to be stored in the first external memory.

According to another aspect of the present invention, there is provided a method of storing original data for pattern matching in a pattern matching apparatus, the method including: dividing the original data into segments of a predetermined size; performing a hash operation on each of the divided segments; setting the first segment of the divided segments on which the hash operations are performed, as a header data segment and the last segment as a tail data segment and storing the header data segment and the last segment in a predetermined storage apparatus; determining whether or not a hash operation value of each segment excluding the header data segment and the tail data segment causes a hash collision with a hash operation value stored in a first external memory disposed outside the pattern matching apparatus; and controlling the hash operation value of each segment determined not to cause a hash collision, to be stored in the first external memory.

According to another aspect of the present invention, there is provided a method of receiving an input of comparison data for which pattern matching is desired to be performed, and performing pattern matching in a pattern matching apparatus capable of loading original data already set for performing pattern matching, the method including: receiving an input of the comparison data and dividing the comparison data into segments of a predetermined size; performing a hash operation on each segment; determining whether or not a hash operation value of each segment for which a hash operation is performed matches a hash operation value stored in the original data loaded in the pattern matching apparatus; and if it is determined that the hash operation values of all the segments match the hash operation values of the original data, notifying that pattern matching of the comparison data is successful.

According to another aspect of the present invention, there is provided an apparatus for storing original data for pattern matching in a pattern matching data storing apparatus, the apparatus including: a segmentation unit receiving an input of the original data and dividing the original data into segments of a predetermined size; a hash operation unit performing a hash operation on each of the segments; a determination unit determining whether or not the hash operation value of each segment for which a hash operation is performed, causes a hash collision with a hash operation value stored in an external memory disposed outside the pattern matching data storing apparatus; and a control unit controlling the hash operation value of each segment determined in the determination unit not to cause a hash collision to be stored in the external memory, and the hash operation value of each segment determined in the determination unit to cause a hash collision to be stored in a storage apparatus that has an access rate faster than that of the external memory.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
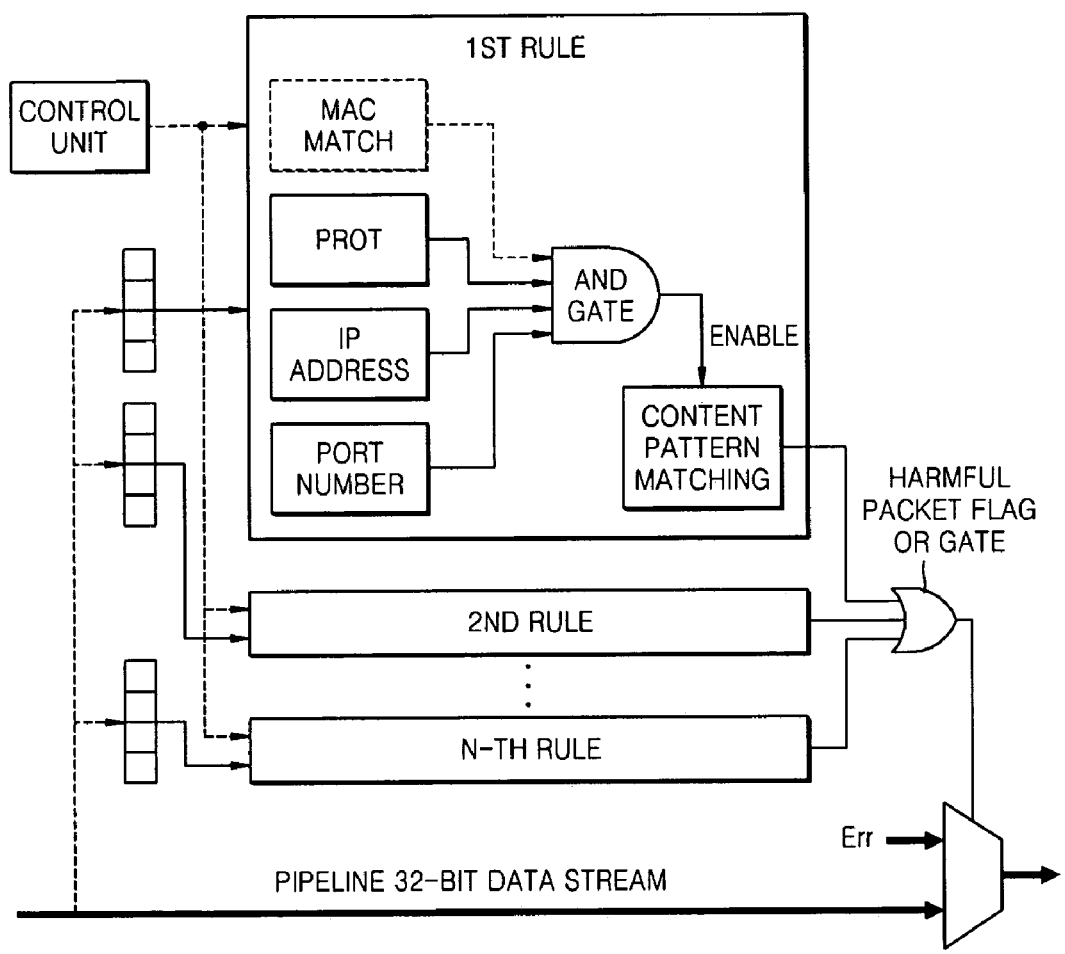
FIG. 1 illustrates an example of a conventional pattern matching apparatus.
Figure 2:
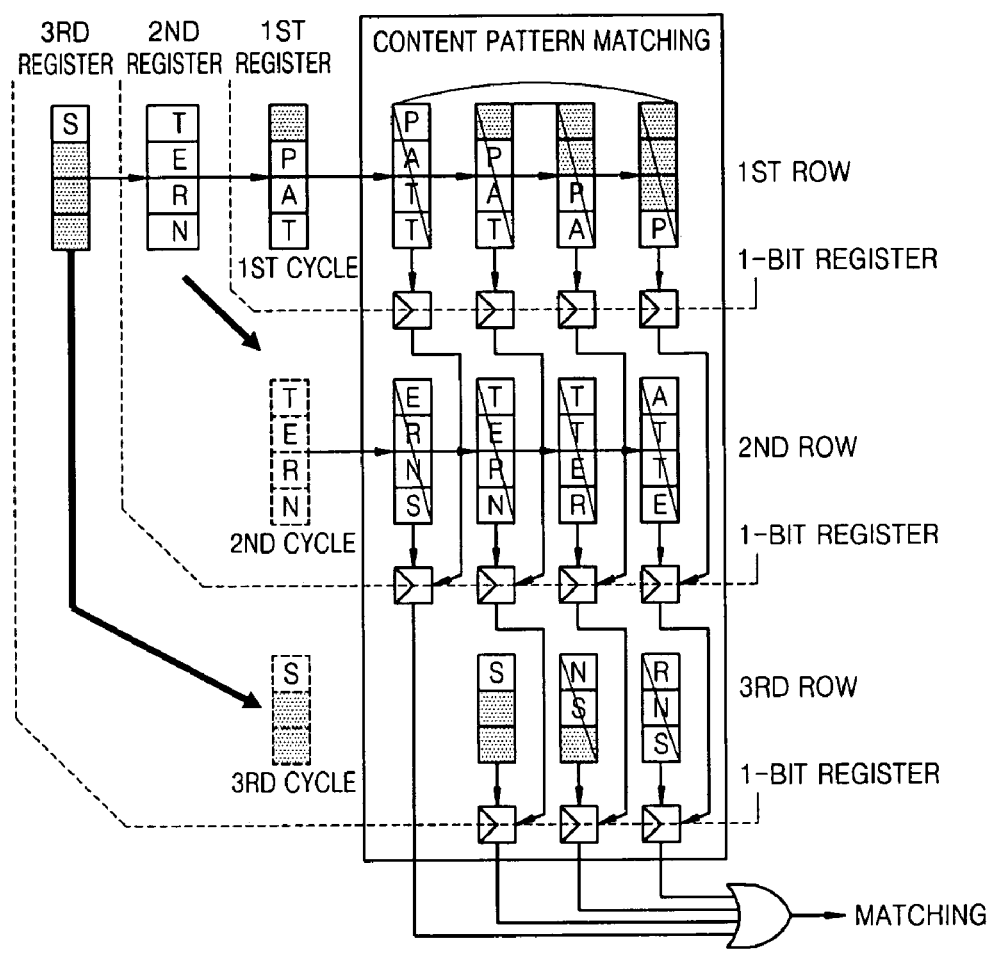
FIG. 2 illustrates another example of a conventional pattern matching apparatus.
Figure 3:
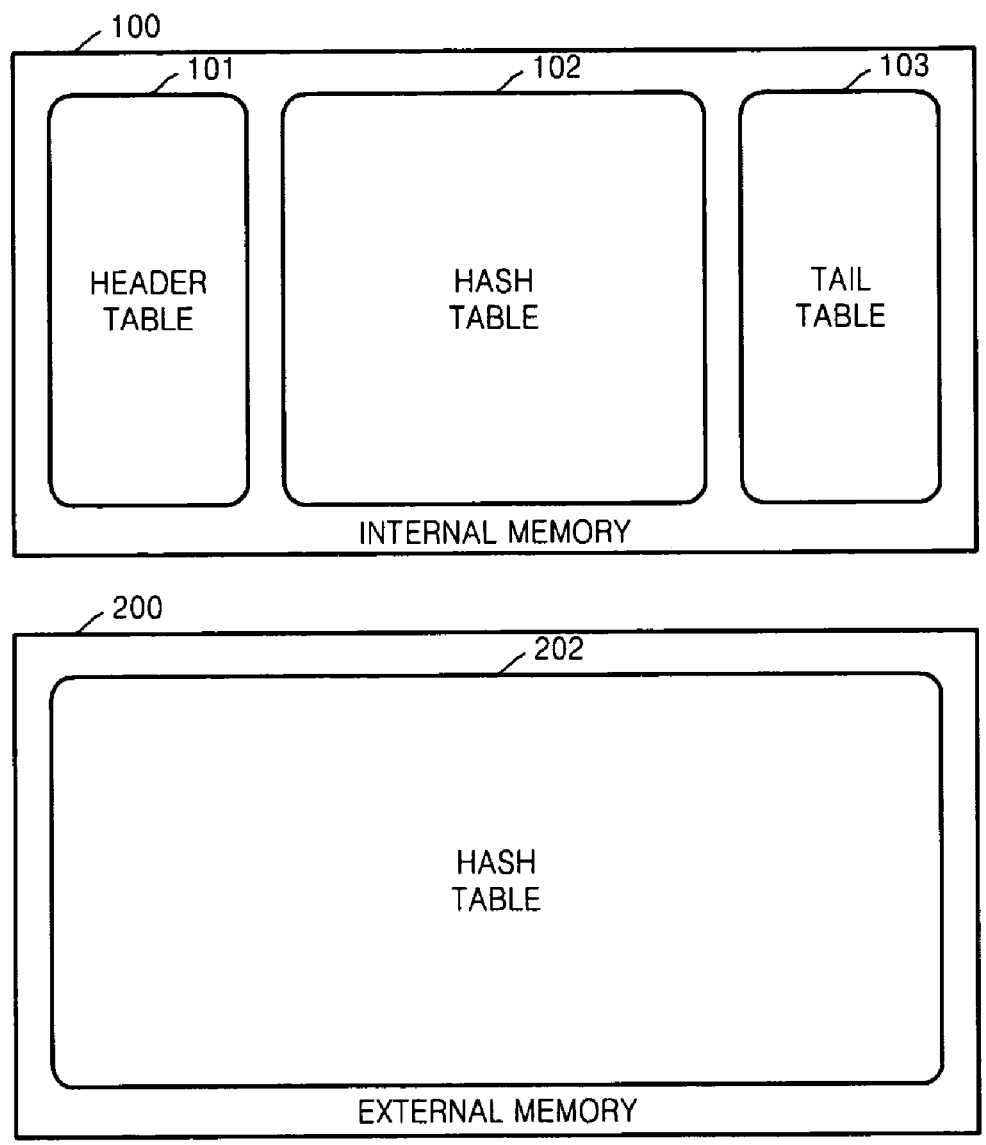
FIG. 3 illustrates a table structure using an external memory and an internal memory desired to be applied to a method and apparatus for storing pattern matching data according to an embodiment of the present invention.

FIG. 3 illustrates a table structure using an external memory 200 and an internal memory 100 desired to be applied to a method and apparatus for storing pattern matching data according to an embodiment of the present invention. Referring to FIG. 3, the internal memory 100 includes a header table 101, a hash table 102, and a tail table 103. The external memory 200 is formed entirely as a hash table 202. Here, the internal memory 100 and the external memory 200 are spaces storing original data for which a user wants to perform pattern matching.

Figure 4:
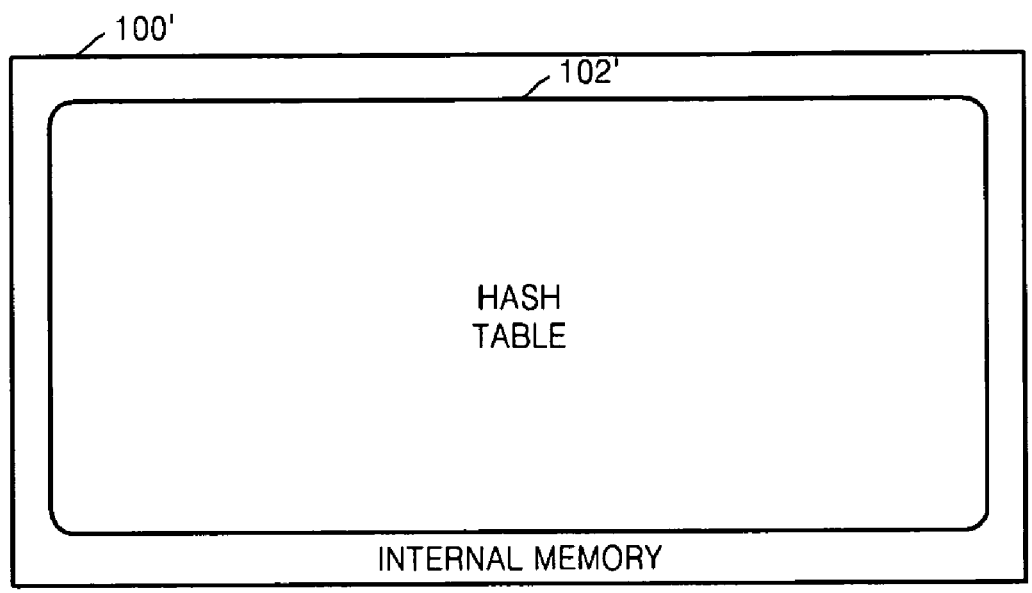
FIG. 4 illustrates a table structure using an external memory and an internal memory desired to be applied to a method and apparatus for storing pattern matching data according to another embodiment of the present invention.
Figure 4:
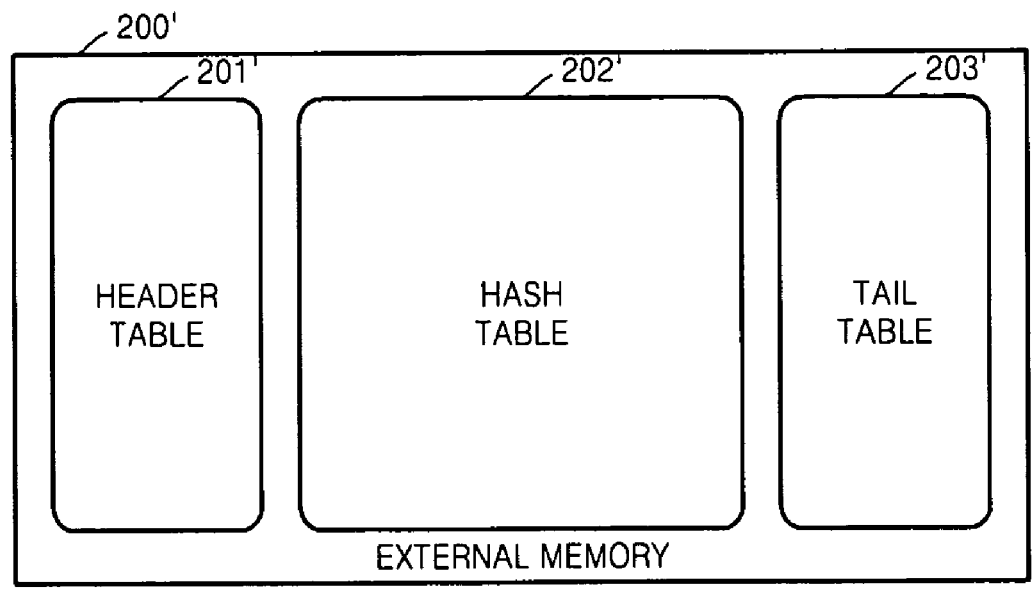

FIG. 4 illustrates a table structure using an external memory 200' and an internal memory 100' desired to be applied to a method and apparatus for storing pattern matching data according to another embodiment of the present invention. Referring to FIG. 4, the external memory 200' includes a header table 201', a hash table 202', and a tail table 203'. The internal memory 100' is formed entirely as a hash table 102'. Here, the external memory 200' and the internal memory 100' are spaces storing original data for which a user wants to perform pattern matching.

In the case of FIG. 3 the internal memory 100 is used to store a header segment and a tail segment, while in the case of FIG. 3 the external memory 200 is used to store a header segment and a tail segment. That is, referring to FIGS. 3 and 4, specific locations of the header segment and the tail segment do not matter and whether the header segment and the tail segment are stored in the internal memory 100 or in the external memory 200 can be determined according to user preference, by considering the performance or the capacity of storage spaces.

A method and apparatus for storing in a pattern matching apparatus, original data for which pattern matching is desired to be performed and a pattern matching method using the method and apparatus according to an embodiment of the present invention will now be explained with reference to the table structures of FIGS. 3 and 4. Though a header table and a tail table are formed in the internal memory 100 in FIG. 3 and the external memory 200' in FIG. 4, only a hash table may be formed without forming a header table and a tail table separately.

Figure 5:
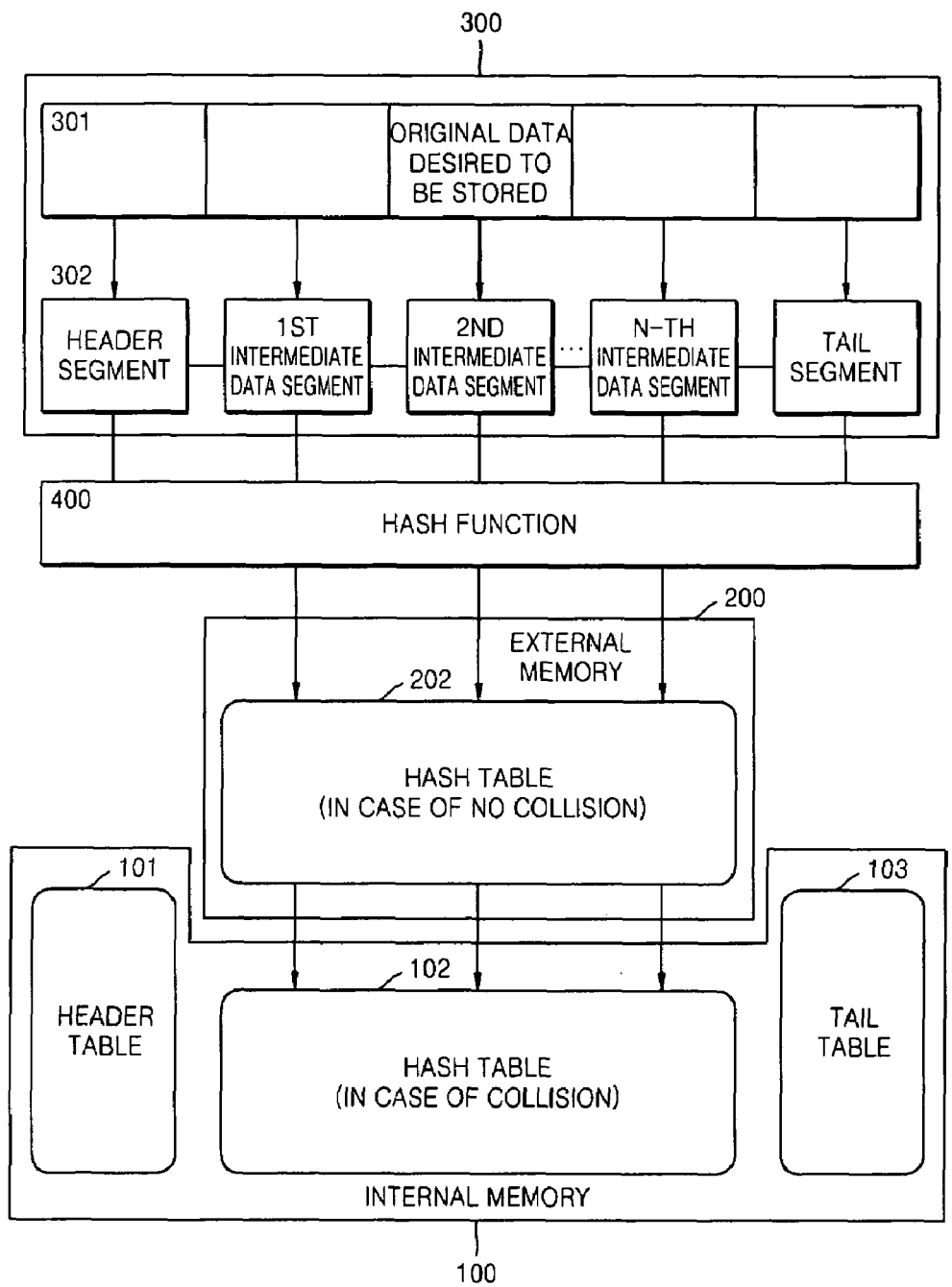
FIG. 5 is a block diagram illustrating a method of storing pattern matching data according to an embodiment of the present invention.

FIG. 5 is a block diagram illustrating a method of storing pattern matching data according to an embodiment of the present invention. Referring to FIG. 5, first, a pattern matching data storing apparatus for storing pattern matching data includes a segmentation unit 300 receiving an input of original data 301, which is desired to be stored by a user in order to perform pattern matching, and dividing the original data 301 into data segments 302 of a predetermined size, a hash function unit 400 performing a hash function of the data segments 302, and an internal memory 100 and an external memory 200 to store hash operation values output through a hash function unit 400.

The segmentation unit 300 of the pattern matching data storing apparatus receives the input of the original data 301 desired to be stored by the user to perform pattern matching and divides the original data 301 into data segments 302 of a predetermined size. The data segments 302 include a header segment, a first intermediate data segment, a second intermediate data segment, . . . , an n-th intermediate data segment and a tail segment.

More specific operations of the segmentation unit 300 will now be explained with examples. When the entire length of the original data 301 of a pattern is M bytes, the original data 301 is divided into segments of N bytes (here, M bytes>N bytes). Here, M mod N=K. That is, when M bytes are divided by N bytes, the last segment remaining becomes K bytes.

Among the data segments 302 of the predetermined size, the first segment is set as a header segment and the last K-byte segment is set as a tail segment. Then, the remaining intermediate segments are set in order as a first intermediate data segment, a second intermediate data segment, . . . , and an n-th intermediate data segment. However, though the header segment and the tail segment are separately set in FIG. 5, the entire data segments may be set as only intermediate data segments without setting a header segment and a tail segment.

The header segment, the intermediate segments, and the tail segment are input to the hash function unit 400 and hash operations are performed.

In storing the data segments output from the hash function unit 400, the header segment output from the hash function unit 400 is stored in a header table 101 of the internal memory 100 and the tail segment output from the hash function unit 400 is stored in a tail table 103 of the internal memory 100.

When the intermediate data segments are output from the hash function unit 400, it is determined whether or not each intermediate data segment causes a collision with a hash operation value stored in the external memory 200, that is, whether or not a hash value identical to the intermediate data segment is stored previously. If it is determined that the intermediate data segment does not cause a collision with the hash operation values already stored in the external memory 200, the intermediate data segment is made to be stored in the external memory 200. Meanwhile, if it is determined that the intermediate data segment causes a collision with a hash value already stored in the external memory, the intermediate data segment is made to be stored in the internal memory 100.

Here, the internal memory 100 is a memory disposed inside the pattern matching data storing apparatus and has a faster access rate than that of the external memory 200 disposed outside the pattern matching data storing apparatus. Also, since the access rate of the external memory 200 is relatively slower than that of the internal memory 100, the external memory 200 is formed as a perfect hash table.

Though the internal memory 100 is explained in FIG. 5, it can be implemented as a second external memory disposed outside the pattern matching data storing apparatus and having an access rate faster than that of the external memory 200.

Figure 6:
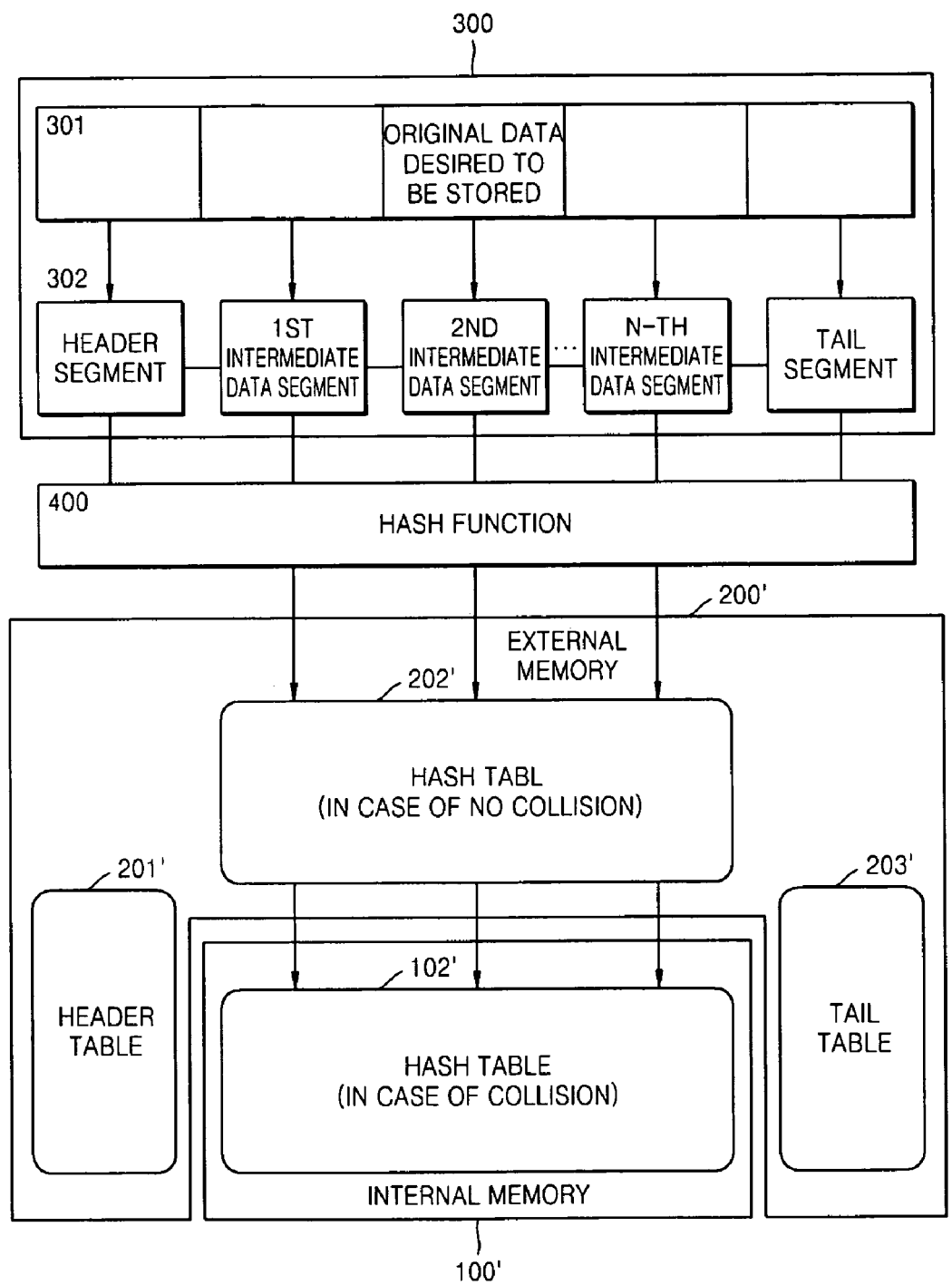
FIG. 6 is a flowchart illustrating a method of storing pattern matching data according to another embodiment of the present invention.

FIG. 6 is a flowchart illustrating a method of storing pattern matching data according to another embodiment of the present invention. Referring to FIG. 6, first, a pattern matching data storing apparatus includes a segmentation unit 300 receiving an input of original data 301, which is desired to be stored by a user in order to perform pattern matching, and dividing the original data 301 into data segments 302 of a predetermined size, a hash function unit 400 performing a hash function of the data segments 302 of the predetermined size, and an internal memory 100' and an external memory 200' to store hash operation values output through the hash function unit 400.

The segmentation unit 300 of the pattern matching data storing apparatus receives the input of the original data 301 desired to be stored by the user to perform pattern matching and divides the original data 301 into data segments 302 of a predetermined size.

More specific operations of the segmentation unit 300 will now be explained with examples. When the entire length of the original data 301 of a pattern is M bytes, the original data 301 is divided into segments of N bytes (here, M bytes>N bytes). Here, M mod N=K. That is, when M bytes are divided by N bytes, the last segment remaining becomes K bytes.

Among the data segments 302 of the predetermined size, the first segment is set as a header segment and the last K-byte segment is set as a tail segment. Then, the remaining intermediate segments are set in order as a first intermediate data segment, a second intermediate data segment, . . . , and an n-th intermediate data segment.

Then the header segment, the intermediate segments, and the tail segment are input to the hash function unit 400 and hash operations are performed.

In storing the data segments output from the hash function unit 400, the header segment output from the hash function unit 400 is stored in a header table 201' of the external memory 200' and the tail segment output from the hash function unit 400 is stored in a tail table 203' of the external memory 200'.

When the intermediate data segments are output from the hash function unit 400, it is determined whether or not each intermediate data segment causes a collision with a hash operation value stored in a hash table 202' of the external memory 200', that is, whether or not a hash value identical to the intermediate data segment is stored previously. If it is determined that the intermediate data segment does not cause a collision with the hash operation values already stored in the hash table 202' of the external memory 200', the intermediate data segment is made to be stored in the hash table 202' of the external memory 200'. Meanwhile, if it is determined that the intermediate data segment causes a collision with a hash value already stored in the hash table 202' of the external memory 200', the intermediate data segment is made to be stored in a hash table 102' of the internal memory 100', Here, the internal memory 100' is a memory disposed inside the pattern matching data storing apparatus and has a faster access rate than that of the external memory 200' disposed outside the pattern matching data storing apparatus. Also, since the access rate of the external memory 200' is relatively slower than that of the internal memory 100', the external memory 200' is formed as a perfect hash table.

Though the internal memory 100' is explained in FIG. 5, it can be implemented as a second external memory disposed outside the pattern matching data storing apparatus and having an access rate faster than that of the external memory 200'.

Figure 7:
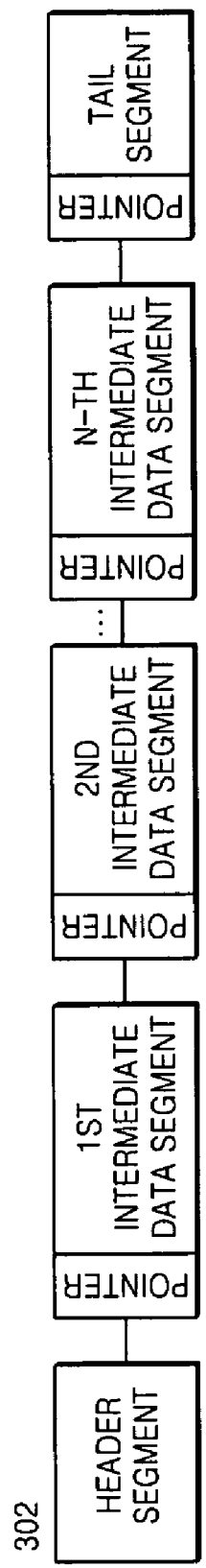
FIG. 7 illustrates the data structures of data segments in FIGS. 5 and 6 in more detail.

FIG. 7 illustrates the data structures of data segments 302 in FIGS. 5 and 6 in more detail. Referring to FIG. 7, it can be seen that the data segments 302 include a header segment, a first intermediate data segment, a second intermediate data segment, . . . , an n-th intermediate data segment and a tail segment. Also, each of the first through n-th intermediate data segments and the tail segment has a pointer including information on the storage location of an immediately preceding segment. That is, the pointer indicates the location storing the immediately preceding segment and if an actual match is found, the pointer becomes important information indicating the result of pattern matching of the preceding segment.

The storage capacities of an internal memory and an external memory when a user stores 100,000 original data items in a pattern matching data storing apparatus will now be explained in more detail. Here, assuming that the size of each original data item is 128 bytes long, if each original data item is divided into 8-byte segments and stored, each original data item is divided into 16 segments.

The first segment of the 16 segments is stored in the header table of the internal memory and the last segment is stored in the tail table of the internal memory.

Then, each of the remaining 14 intermediate data segments includes a pointer. Here, if it is assumed that the pointer of each intermediate data segment has a size of about 3 bytes (24 bits, a 24-bit pointer can indicate 224 locations), the length of each of the intermediate data segments becomes 11 bytes (8 bytes+3 bytes) and the total length of each of the intermediate data segments becomes 154 bytes (11 bytes*14). Accordingly, if storing a perfect hash table in the external memory is possible and all 100,000 original data items are stored in the external memory, a space of 15.4 Mbytes (100,000*154 bytes) is required. This assumes that the external memory is a perfect hash table, and if a perfect hash through the perfect hash table is provided, when pattern matching is performed, one access to the external memory enables access to an 8-byte unit.

Here, if the storage space of the external memory is reduced, a hash collision can occur, and in that case, the internal memory can be utilized. Here, since the internal memory has a faster access rate, the collision does not matter.

According to the current embodiment of the present invention described above, the first segment of the 16 segments is stored in the header table of the internal memory and the last segment is stored in the tail table of the internal memory. However, the first segment of the 16 segments may also be stored in the header table of the external memory and the last segment may also be stored in the tail table of the external memory. In this case, the external memory should be built to have a storage space wider than that of the external memory described above.

Figure 8:
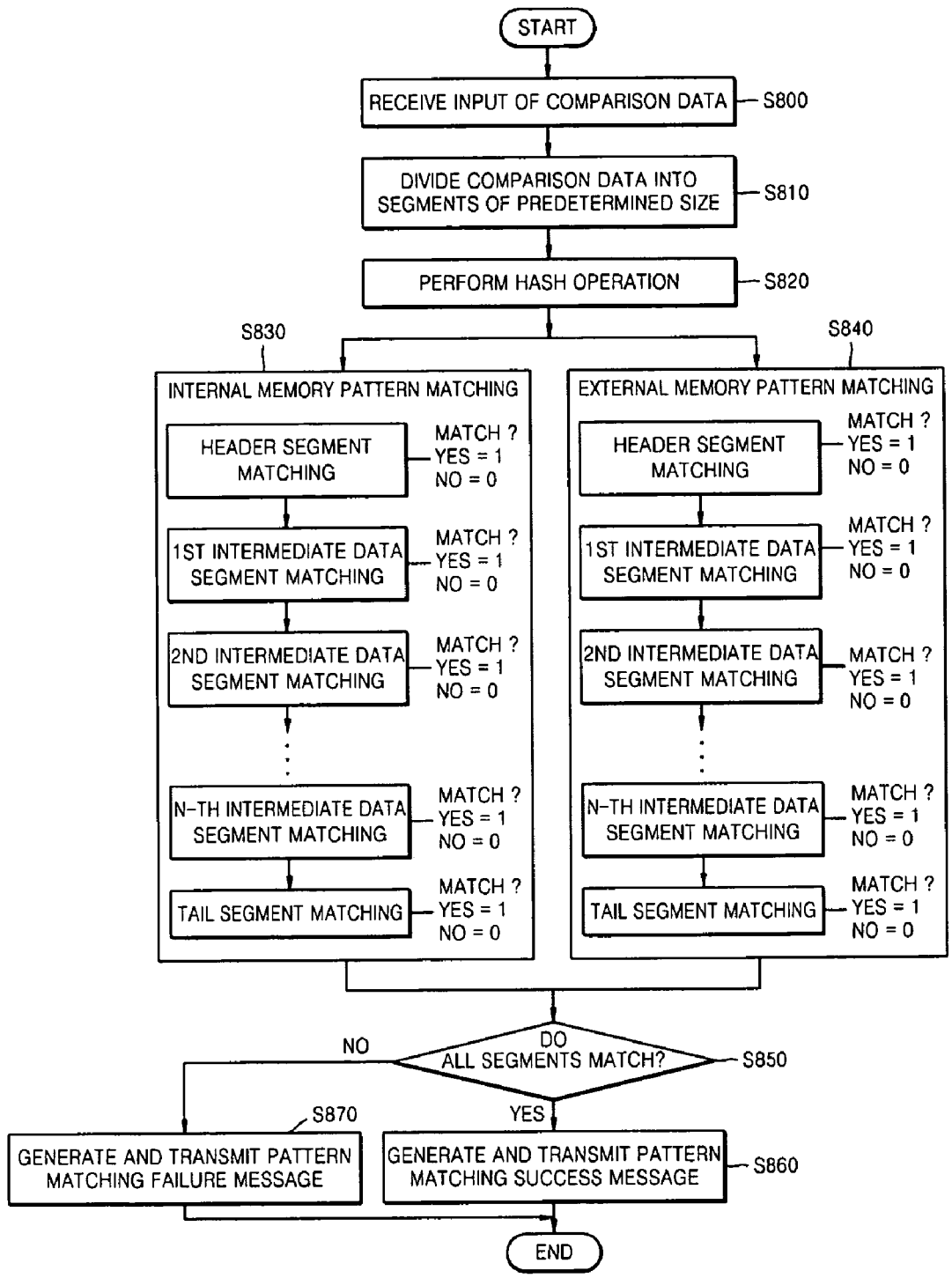
FIG. 8 is a flowchart illustrating a method of pattern matching according to an embodiment of the present invention.

FIG. 8 is a flowchart illustrating a method of pattern matching according to an embodiment of the present invention. Referring to FIG. 8, the method includes receiving an input of comparison data for which pattern matching is desired to be performed, and performing pattern matching in a pattern matching apparatus capable of loading original data already set for performing pattern matching. First, the input of the comparison data for which pattern matching is desired to be performed is received in the pattern matching apparatus capable of loading the original data already set for performing pattern matching in operation S800.

Next, the comparison data received in operation S800 is divided into segments of a predetermined size in operation S810. Here, the size of the comparison data segments should be the same as the size of original data segments. That is, if the user divides the original data by N bytes, the comparison data should also be divided by N bytes.

Next, a hash operation for each segment divided in operation S810 is performed in operation S820.

Then, it is determined whether or not the hash operation value of each segment obtained in operation S820 matches a hash operation value stored in the original data stored in an internal memory disposed inside the pattern matching apparatus in operation S830. Here, if the hash operation values match, the segment corresponding to the hash value is set to have a value of '1', while if the hash operation values do not match, the segment is set to have a value of '0'.

Also, while performing operation S830, it is also determined whether or not the hash operation value of each segment obtained in operation S820 matches a hash operation value stored in the original data stored in an external memory disposed inside the pattern matching apparatus in operation S840. Here, if the hash operation values match, the segment corresponding to the hash value is set to have a value of '1', while if the hash operation values do not match, the segment is set to have a value of '0'.

After operations S830 and S840, it is determined whether or not all hash operations values match in each segment in operation S850. Here, pattern matching performed in operations S830 and S840 is for determining whether or not at least one value is '1' in a segment and all segments have values of '1'.

If the result of the determination in operation S850 indicates that hash operation values in all segments match, operation S860 is performed to notify that the pattern of the comparison data matches the original data and then the pattern matching operation is finished.

Meanwhile, if the result of the determination in the operation S850 indicates that hash operation values do not match in all segments, that is, if any one segment has values of all '0s' both in operations S830 and S840, operation S870 is performed to notify that the pattern of the comparison data does not match the original data and then the pattern operation is finished.

Figure 9:
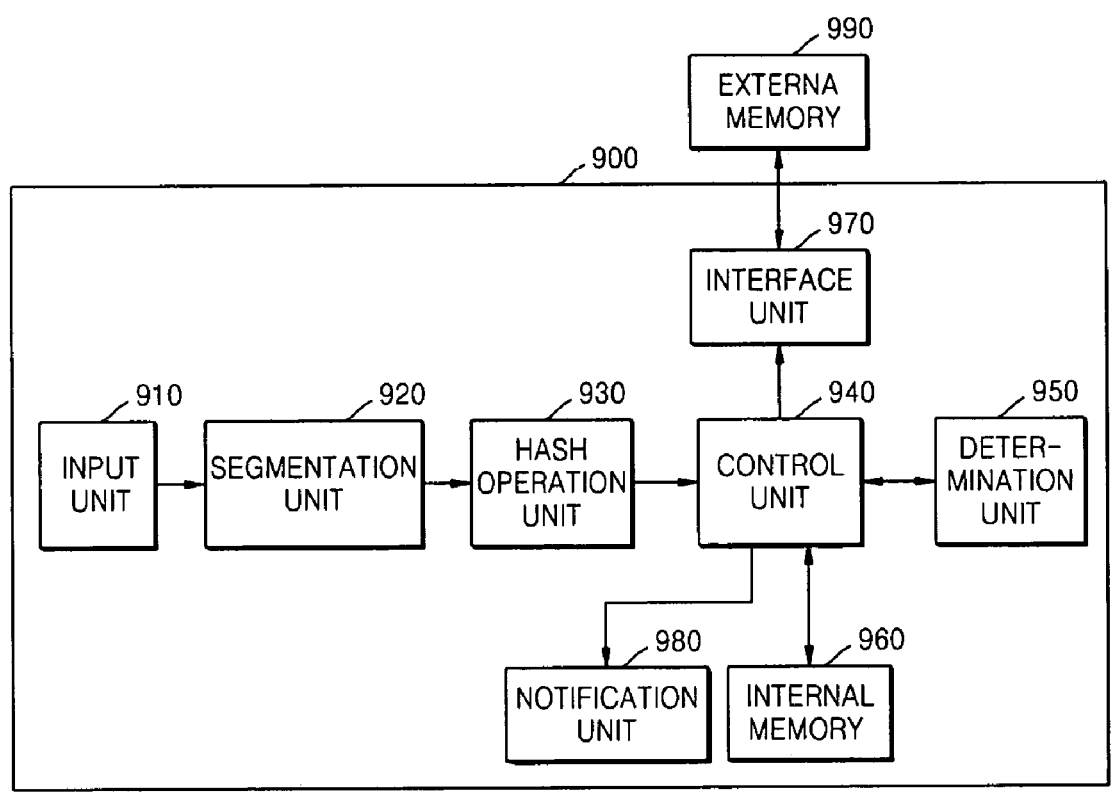
FIG. 9 is a block diagram of a pattern matching data storing apparatus according to an embodiment of the present invention.

FIG. 9 is a block diagram of a pattern matching data storing apparatus 900 according to an embodiment of the present invention. Referring to FIG. 9, the pattern matching data storing apparatus 900 includes an input unit 910, a segmentation unit 920, a hash function unit 930, a control unit 940, a determination unit 950, an internal memory 960, an interface unit 970, and a notification unit 980. The pattern matching data storing apparatus 900 communicates data with an external memory 990 through the interface unit 970.

The input unit 910 receives an input of original data desired to be stored by a user in order to perform pattern matching, through a user interface.

The segmentation unit 920 receives the input of the original data from the input unit 910 and divides the original data into segments of a predetermined size.

The hash operation unit 930 performs a hash operation for each segment divided in the segmentation unit 920.

The determination unit 950 receives an input of the hash operation value of each segment for which the hash operation is performed in the hash operation unit 930, through the control unit 940, and determines whether or not a hash collision occurs with a hash operation value stored in the external memory 990 disposed outside the pattern matching data storing apparatus 900.

The interface unit 970 performs an interface function between the external memory 990 and the pattern matching data storing apparatus 900.

The external memory 990 is disposed outside the pattern matching data storing apparatus 900 and is formed as a perfect hash table.

The internal memory 960 is disposed inside the pattern matching data storing apparatus 900 and is a storage device with a high access rate.

The control unit 940 controls the hash operation value of each segment that is determined not to cause a hash collision in the determination unit 950, to be stored in the external memory 990 through the interface unit 970, and controls the hash operation value of each segment that is determined to cause a hash collision in the determination unit 950, to be stored in the internal memory 960 having a faster access rate than that of the external memory 990, through the interface unit 970.

Also, when the pattern matching data storing apparatus 900 is constructed as described above, pattern matching can be performed by receiving an input of comparison data desired to be compared with the original data. This will now be explained.

The input unit 910 receives an input of the comparison data for which pattern matching with the original data is desired to be performed, through the user interface or an external communication network.

The segmentation unit 920 receives the comparison data from the input unit 910 and divides the comparison data into segments of a predetermined size.

The hash operation unit 930 performs a hash operation for each segment of the comparison data divided in the segmentation unit 920.

The determination unit 950 receives through the control unit 940, the hash operation value of each segment of the comparison data for which the hash operation is performed, and determines whether or not the hash operation value matches a hash operation value stored in the internal memory 960 disposed inside the pattern matching data storing apparatus 900 and in the external memory 990 disposed outside the pattern matching data storing apparatus 900.

If it is determined that the hash operation value of each segment matches a hash operation value stored in either of the internal memory 960 or the external memory 990 and all segments have matches, the determination unit 950 generates a pattern matching success message.

Meanwhile, if it is determined that a hash value of at least one segment does not match any hash value stored in the internal memory 960 and the external memory 990, the determination unit 950 generates a pattern matching failure message.

If the determination unit 950 generates the pattern matching success message, the control unit 940 notifies through the notification unit 980 that the pattern matches the original data. If the determination unit 950 generates the pattern matching failure message, the control unit 940 notifies through the notification unit 980 that the pattern does not match.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The present invention relates to a method and apparatus for storing pattern matching data and a pattern matching method using the method and apparatus, and has the following effects.

A dual structure of an external memory and an internal memory can provide a space capable of storing original data for which pattern matching is desired to be performed by a number of users, and a pattern matching function can be performed in the internal memory and the external memory at the same time such that the pattern matching can be performed at a faster speed.

Also, in order to compensate for the speed of the external memory being slower than that of the internal memory, the external memory can be implemented as a perfect hash table so that the frequency of memory accesses can be minimized.

Accordingly, through the method and apparatus provided by the present invention, users can store a large volume of original data for which pattern matching is desired to be performed, in a pattern matching apparatus. In addition, comparison data that is desired to be compared with the large volume of patterns can be input and pattern matching can be performed in real time at high speed.

As described above, the present invention can be applied in a variety of fields such as intrusion detection systems, spam mail finding systems, and large capacity databases.

What is claimed is:

1. A method of storing original data for pattern matching in a pattern matching apparatus, wherein the pattern matching apparatus includes an internal memory disposed inside the pattern matching apparatus and a first external memory disposed outside the pattern matching apparatus, the method comprising:

dividing the original data into segments of a predetermined size;

performing a hash operation on each of the divided segments;

determining whether or not a hash operation value of each segment causes a hash collision with a hash operation value stored in the first external memory; and controlling the hash operation value of each segment determined not to cause a hash collision, to be stored in the first external memory.

2. The method of claim 1, further comprising storing the hash operation value of each segment determined to cause a hash collision in the internal memory.

3. The method of claim 1, wherein an access rate of the internal memory is faster than that of the first external memory.

4. The method of claim 1, further comprising storing the hash operation value of each segment determined to cause a hash collision in a second external memory that has an access rate faster than that of the first external memory and is disposed outside the pattern matching apparatus.

5. The method of claim 1, further comprising between the dividing of the original data into segments and the performing of the hash operation on each of the divided segments, inserting a pointer to each of the segments excluding the first segment of the divided segments, the pointer having information on a storage location of an immediately preceding segment.

6. The method of claim 1, wherein each segment has the same size.

7. A method of storing original data for pattern matching in a pattern matching apparatus, wherein the pattern matching apparatus includes an internal memory disposed inside the pattern matching apparatus and a first external memory disposed outside the pattern matching apparatus, the method comprising:
   dividing the original data into segments of a predetermined size;
   performing a hash operation on each of the divided segments;
   setting the first segment of the divided segments on which the hash operations are performed, as a header data segment and the last segment as a tail data segment and storing the header data segment and the last segment in a predetermined storage apparatus;
   determining whether or not a hash operation value of each segment excluding the header data segment and the tail data segment causes a hash collision with a hash operation value stored in the first external memory; and
   controlling the hash operation value of each segment determined not to cause a hash collision, to be stored in the first external memory.

8. The method of claim 7, further comprising storing the hash operation value of each segment determined to cause a hash collision in the internal memory.

9. The method of claim 8, wherein an access rate of the internal memory is faster than that of the first external memory.

10. The method of claim 7, further comprising storing the hash operation value of each segment determined to cause a hash collision in a second external memory that has an access rate faster than that of the first external memory and is disposed outside the pattern matching apparatus.

11. The method of claim 7, further comprising between the dividing of the original data into segments and the performing of the hash operation on each of the divided segments, inserting a pointer to each of the segments excluding the first segment of the divided segments, the pointer having information on a storage location of an immediately preceding segment.

12. The method of claim 7, wherein the predetermined storage apparatus is one of the first external memory and the internal memory disposed inside the pattern matching apparatus.

13. A method of receiving an input of comparison data for which pattern matching is desired to be performed, and performing pattern matching in a pattern matching apparatus capable of loading original data already set for performing pattern matching, wherein the pattern matching apparatus includes an internal memory disposed inside the pattern matching apparatus and an external memory disposed outside the pattern matching apparatus, the method comprising:
   receiving an input of the comparison data and dividing the comparison data into segments of a predetermined size;
   performing a hash operation on each segment;
   determining for all segments simultaneously whether or not a hash operation value of each segment for which a hash operation is performed matches a hash operation value stored in the original data loaded in the internal memory of the pattern matching apparatus or in the external memory disposed outside the pattern matching apparatus; and
   if it is determined that the hash operation values of all the segments match the hash operation values of the original data either stored in the internal memory or the external memory, notifying that pattern matching of the comparison data is successful.

14. The method of claim 13, further comprising notifying that pattern matching of the comparison data is not successful if it is determined that at least one of the segments does not match the hash operation values of the original data.

15. The method of claim 13, wherein the original data loaded in the pattern matching apparatus is stored in one of the external memory and the internal memory that has an access rate faster than that of the external memory.

16. The method of claim 15, wherein the determining of whether or not the hash operation value of each segment matches a hash operation value of the original data stored in the external memory and the determining of whether or not the hash operation value of each segment matches a hash operation value of the original data stored in the internal memory are performed concurrently.

17. An apparatus for storing original data for pattern matching in a pattern matching data storing device, the apparatus comprising:
   a segmentation unit receiving an input of the original data and dividing the original data into segments of a predetermined size;
   a hash operation unit performing a hash operation on each of the segments;
   a determination unit determining whether or not the hash operation value of each segment for which a hash operation is performed, causes a hash collision with a hash operation value stored in an external memory disposed outside the pattern matching data storing apparatus; and
   a control unit controlling the hash operation value of each segment determined in the determination unit not to cause a hash collision to be stored in the external memory, and the hash operation value of each segment determined in the determination unit to cause a hash collision to be stored in a storage apparatus that has an access rate faster than that of the external memory.

18. The apparatus of claim 17, wherein the storage apparatus storing the hash operation value of each segment that is determined to cause a hash collision is an internal memory disposed inside the pattern matching apparatus.

19. The apparatus of claim 17, wherein if it is determined in the determination unit that a hash collision occurs, the control unit controls the hash operation value of each segment to be stored in a second external memory that has an access rate faster than that of the external memory and is disposed outside the pattern matching apparatus.

* * * * *